June 22, 1926.

C. A. WARDEN 1,589,776

SELF ALIGNING CABLE GUIDE

Filed August 29, 1924

2 Sheets-Sheet 1

Inventor
C. A. Warden

By Milton E. Lowry
Attorney

June 22, 1926. 1,589,776

C. A. WARDEN

SELF ALIGNING CABLE GUIDE

Filed August 29, 1924  2 Sheets-Sheet 2

Inventor
C. A. Warden
By Milton E. Lowry
Attorney

Patented June 22, 1926.

1,589,776

UNITED STATES PATENT OFFICE.

CHARLES A. WARDEN, OF HUNTINGTON, WEST VIRGINIA.

SELF-ALIGNING CABLE GUIDE.

Application filed August 29, 1924. Serial No. 734,897.

This invention relates to new and useful improvements in self-aligning cable guides and more particularly adapted for use in connection with electric gathering locomotives.

The primary object of the invention is to provide a cable guide, especially adapted for use in connection with the cable spooling mechanism of an electric gathering locomotive used in coal mines and the like.

A further object of the invention is to provide a guide, for a traveling cable, of the above mentioned type which will automatically align itself irrespective of the changes of the plane in which the cable travels.

Other objects and advantages of the invention will be apparent during the course of the following description.

Figure 1:
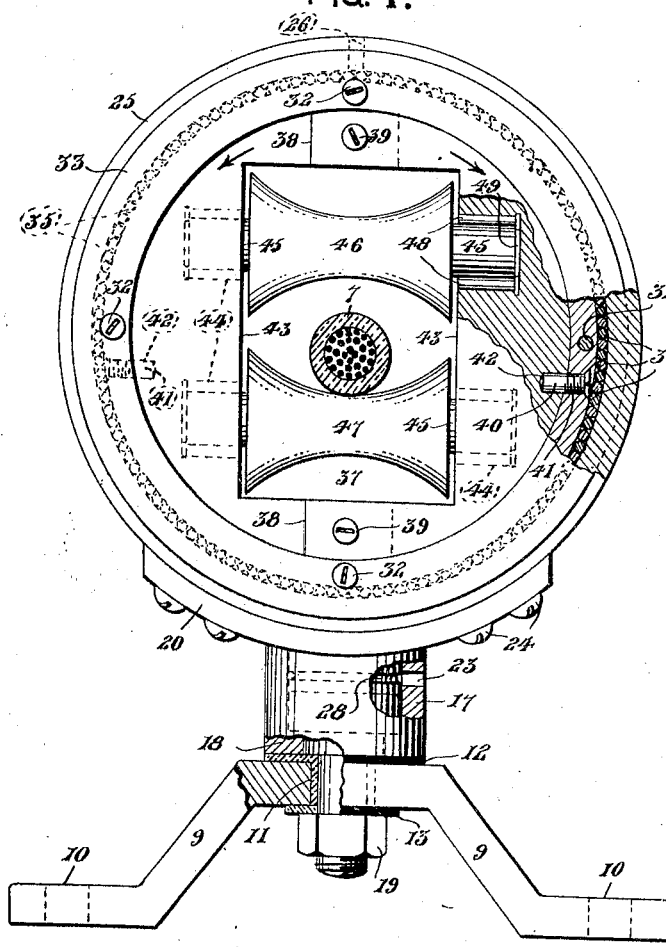
Figure 2:
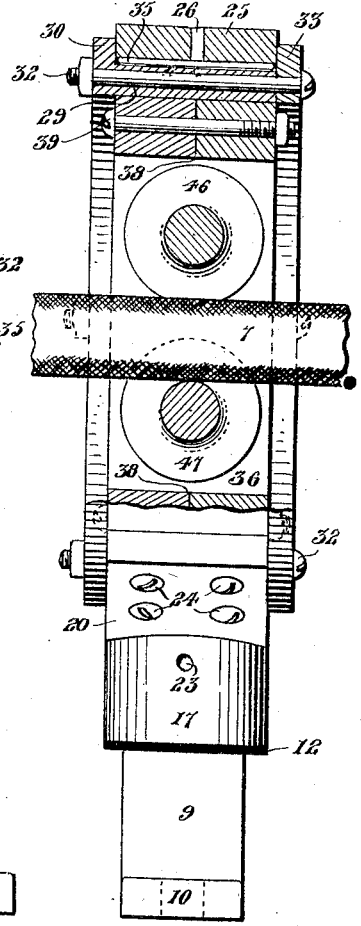
Figure 3:
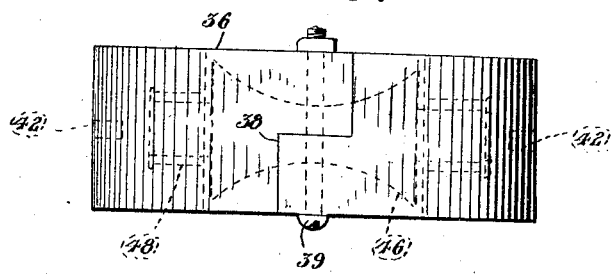
Figure 4:
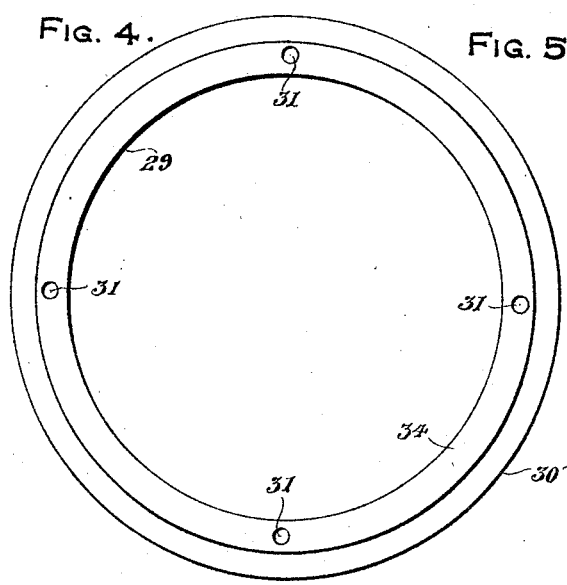
Figure 5:
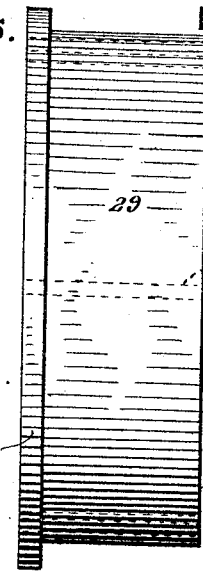
Figure 6:
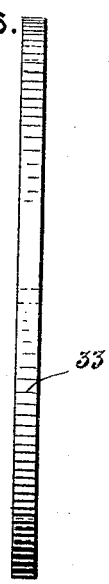
Figure 7:
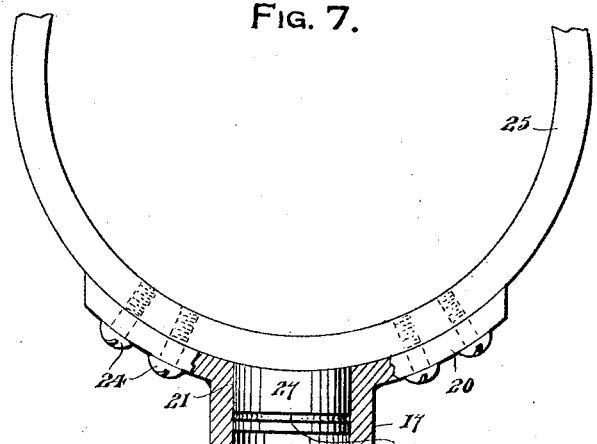
Figure 8:
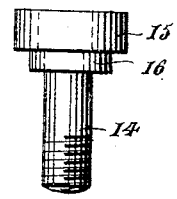
Figure 9:
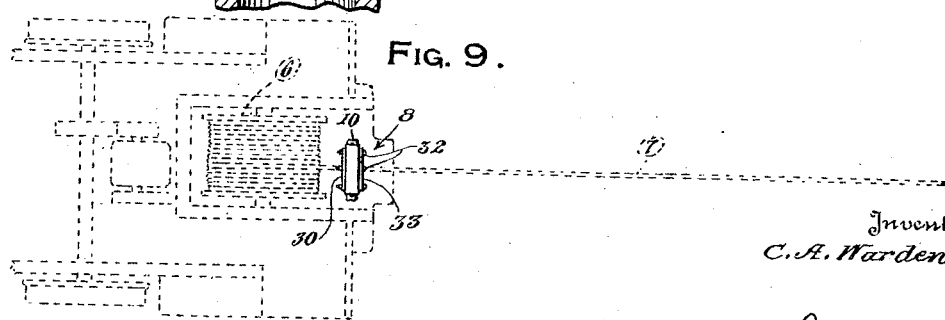

In the accompanying drawings forming a part of this specification and in which like numerals are employed to designate like parts throughout the same, Figure 1 is a front elevational view partly broken away of the cable guide embodying this invention, Figure 2 is a partly vertical sectional view and partly elevational view of the cable guide structure illustrated in Figure 1, Figure 3 is an edge plan view of the two part roller supporting block shown in Figures 1 and 2, Figure 4 is an elevational view of a part of an inner ring shown in Figures 1 and 2 as forming a part of the cable guide, Figure 5 is an edge elevational view of the part shown in Figure 4, Figure 6 is an edge elevational view of a detachable flange ring adapted for being attached to the structure illustrated in Figures 4 and 5, Figure 7 illustrates a fragmentary portion of an outer ring, shown in elevation, with a connector element, shown partly in elevation and partly in section, attached thereto, Figure 8 is a detail elevational view of a connecting bolt employed for pivotally connecting the cable guide structure to a supporting bracket, and Figure 9 is a top plan view of the cable guide properly attached to an electric gathering locomotive and the cable spooling device carried thereby.

In the drawings, wherein for the purpose of illustration is shown a preferred embodiment of this invention, the numeral 5, see Fig. 9, designates an electric gathering locomotive which has suitably mounted thereon a cable spool 6 onto and off which the cable 7 is wound. Located in proximity to the cable spool 6 and adapted for having the traveling cable 7 pass therethrough is the self-aligning cable guide embodying this invention and referred to in its entirety by the reference numeral 8.

In the remaining figures the detail features of construction of this self-aligning cable guide are illustrated and consist of an arched bracket 9 having the apertured lugs 10 by means of which the bracket may be suitably attached to the gathering locomotive 5. The intermediate portion of this arched bracket 9 is provided with an aperture 11 within which is positioned the insulating gasket 12 and cooperating washer 13. Received within the bore of the gasket 12 is a bolt 14, see Figures 1 and 8, which is provided with a cylindrical head 15 having its inner edge rabbeted, as at 16. This bolt 14 is employed for pivotally connecting the tubular stem 17 to the bracket by means of the annular inwardly directed flange 18 which is carried by one end of the stem and is received within the rabbeted portion 16 of the cylindrical bolt head 15. The threaded end of this bolt receives the nut 19 for maintaining these elements in relative positions as best illustrated in Figure 1. The stem 17 is provided with an arcuate plate 20 which is formed with the remaining end of said stem and has an opening 21 formed therein which registers with the bore 22 of the stem 17. A lubricating opening 23 is formed in the wall of the tubular stem 17 for permitting the feeding of lubricant into the bore 22 of the stem.

Removably secured to the arcuate plate 20, as by the screws 24, is a ring 25 which has formed therein, at a point substantially diametrically opposed to the stem 17, a lubricant feeding opening 26.

By inspecting Figures 1 and 7, it will be seen that the ring 25 has projecting radially therefrom a boss 27 which is positioned within the bore 22 of the tubular stem 17 when the ring is secured thereto. This boss 27 is provided with an annular groove 28 which registers with the lubricant feeding opening 23, formed in the stem 17, and is employed for conveying lubricant to all points of the bore 22 of the stem for properly lubricating the connection between the stem 17 and the head 15 of the bolt 14.

In Figures 4 and 5 there is shown a ring 29 which has formed integrally therewith an annular outwardly projecting flange 30. At equidistant points around this ring 29 there are drilled the transversely extending openings 31 which are employed for receiving bolts 32, see Figures 1 and 2, which are employed for fastening the removable flange 33 to the plane edge 34 of the ring 29. In Figures 1 and 2, the ring 29 with its integral flange 30 and removable flange ring 33, are shown as attached to the ring 25. For the purpose of permitting the free rotation of this inner ring 29 within the outer ring 25, roller bearings 35 are positioned between the adjacent faces of the said rings. These roller bearings are retained in place by the flange 30 and flange ring 33 and may be removed with the ring 29 by withdrawing the bolts 32 and detaching the flange ring 33.

Removably positioned within the bore of the inner ring 29 is a two part roller carrying block 36 which has the roller opening 37 formed therein. The two parts of this block are connected by the halving joints 38 and the bolts 39. This two part roller carrying block 36 is maintained immovable in respect to the inner ring 29 by means of the set screws 40 which are threaded in the openings 41 formed in the ring 29 and have their inner ends projecting into pockets 42 formed in the parts of the block 36.

The opposite walls 43 of the roller opening 37 have the bearings 44 formed therein and arranged in transversely aligned spaced pairs. These bearings 44 are provided for the reception of the journals 45 carried by the opposite ends of the concave rollers 46 and 47.

The cable 7 is illustrated in Figures 1 and 2 as being threaded through the roller opening 37 between the adjacent concaved faces of the rollers 46 and 47.

It will now be seen that the rollers 46 and 47 rotate in respect to the roller carrying block 36 and that the inner ring 29, to which the roller carrying block 36 is attached, may rotate within the outer ring 25 which is attached to the stem 17. This whole structure may pivot upon its vertically extending pivot bolt 14 for permitting the axis of the roller opening 37 to extend horizontally in any direction. The arrows in Figure 1 show the clockwise and counter-clockwise movement of the inner ring 29 with the roller carrying block 36.

For the purpose of permitting the rollers 46 and 47 to rotate freely, the roller bearings 48 are positioned within the bearings 44 and around the journals 45. These rollers 48 may be retained in their proper positions by any suitable means such as roller bearing cages 49.

The operation of this self-aligning cable guide may be described as follows:

In Figure 9 the cable 7 is illustrated as traveling in a plane extending truly vertical and in longitudinal alignment with the gathering locomotive 5. With the cable 7 traveling in this plane, it will ride upon the roller 47 as illustrated in Figures 1 and 2. It will be understood that should the cable 7 travel with its outer end located above the axis of the roller opening 37, the cable 7 will engage the upper roller 46. Should the outer end of the cable 7 be located laterally in either direction to the central longitudinal plane of the cable spool 6, the cable 7 at its point of engagement with the roller 47 or 46, will be pulled laterally of the vertical axis of the guide. This lateral pull of the cable 7 will cause the guide to pivot upon its vertically extending pivot bolt 14 and the inner ring 29 with its roller carrying block 36 will rotate within the outer ring 25 for causing the axis of rotation of the supporting roller 47 or 46 to be maintained at right angles to the plane of travel of the cable for the purpose of keeping the cable centered upon the concaved surface of said supporting roller. It will now be seen that the cable 7 will never become jammed but will always be maintained centered upon its supporting roller.

It is to be understood that the form of this invention herewith shown and described is to be taken as the preferred example of the same, and that various changes in the shape, size, and arrangement of parts may be resorted to without departing from the spirit of the invention or the scope of the subjoined claims.

Having thus described the invention, I claim:

1. In a device of the type described, a support, a ring pivoted on said support, a second ring rotatably received within the pivoted ring, a two part block removably attached to the rotatable ring, said block having an opening formed therein, and parallel rollers positioned in said opening and journaled in said block.

2. In a device of the type described, a supporting bracket, a ring, means for pivotally mounting said ring on said bracket, said means including a hollow stem carried by said ring, a pivot bolt having a circular head provided with a rabbeted edge fastened to said bracket, and means carried by said hollow stem and received within the rabbeted edge of said bolt for pivotally connecting the stem to said head; a second ring rotatably carried by the pivoted ring, a concaved roller, and means for rotatably mounting said roller in the rotatable ring.

3. In a device of the type described, a supporting bracket, a ring, means for pivotally mounting said ring on said bracket, said means including a hollow stem carried by said ring, a pivot bolt having a circular head provided with a rabbeted edge fastened to said bracket, and means carried by said hollow stem and received within the rabbeted edge of said bolt for pivotally connecting the stem to said head; a second ring rotatably carried by the pivoted ring, a block attached to said rotatable ring, journal bearings formed in said block, and rollers journaled in said bearings.

4. In a device of the type described, a supporting bracket, a ring, means for pivotally mounting said ring on said bracket, said means including a hollow stem carried by said ring, a pivot bolt having a circular head provided with a rabbeted edge fastened to said bracket, and means carried by said hollow stem and received within the rabbeted edge of said bolt for pivotally connecting the stem to said head; a second ring rotatably carried by the pivoted ring, a block attached to said rotatable ring, and a pair of parallel concaved rollers journaled in said block.

5. In a device of the type described, a supporting bracket, a ring, means for pivotally mounting said ring on said bracket, said means including a hollow stem carried by said ring, a pivot bolt having a circular head provided with a rabbeted edge fastened to said bracket, and means carried by said hollow stem and received within the rabbeted edge of said bolt for pivotally connecting the stem to said head; a second ring rotatably received within the pivoted ring, a two part block removably attached to the rotatable ring, said block having an opening formed therein, and parallel rollers positioned in said opening and journaled in said block.

6. In a device of the type described, a supporting bracket, a ring, means for pivotally mounting said ring on said bracket, said means including a hollow stem carried by said ring, a pivot bolt having a circular head provided with a rabbeted edge fastened to said bracket, and means carried by said hollow stem and received within the rabbeted edge of said bolt for pivotally connecting the stem to said head; a second ring rotatably carried by the pivoted ring, antifriction means between said rings, a concave roller, and means for rotatably mounting said roller in the rotatable ring.

7. In a device of the type described, a support, a ring pivotally mounted thereon, a second ring removably, rotatably mounted in the pivoted ring, roller bearings between the adjacent faces of said rings, a block removably mounted in the bore of the rotatable ring, said block being centrally cut away, and a pair of concave rollers in said cut away portion journaled in said block.

8. In a device of the type described, a support, a ring pivotally mounted thereon, a second ring, means for removably, rotatably mounting the second ring in the bore of the first mentioned ring, said means including an annular outwardly projecting flange formed integrally with said second ring, and a flange ring removably attached to the second ring; roller bearings between the adjacent parallel faces of said rings and retained in place by the flanges carried by the second ring, a block removably mounted in the bore of the rotatable ring, said block being centrally cut away, and a pair of concave rollers in said cut away portion journaled in said block.

9. In a device of the type described, a support, a ring pivotally mounted thereon, a second ring removably, rotatably mounted in the pivoted ring, roller bearings between the adjacent faces of said rings, a two part block having complemental cut away portions for forming a roller opening removably mounted in said rotatable ring, bearings formed in the opposite walls of said complemental cut away portions, rollers having integral journals, and means for separably connecting the parts of said block for permitting the roller journals to be mounted within said last mentioned bearings.

In testimony whereof I affix my signature.

CHARLES A. WARDEN.